United States Patent
Garcia et al.

(10) Patent No.: US 8,186,460 B2
(45) Date of Patent: May 29, 2012

(54) HARD MATERIAL INSERT AND CORE BIT

(75) Inventors: Luis Fernando Garcia, Chur (CH); Alfred Lammer, Mels (CH); Klaus-Peter Bohn, Gams (CH); Till Cramer, Gams (CH); Peter Mugg, Nueziders (AT); Steven Moseley, Feldkirch-Tisis (AT)

(73) Assignee: Hilti Aktiengesellschaft, Schaan (LI)

( * ) Notice: Subject to any disclaimer, the term of this patent is extended or adjusted under 35 U.S.C. 154(b) by 298 days.

(21) Appl. No.: 12/381,267

(22) Filed: Mar. 9, 2009

(65) Prior Publication Data

US 2009/0242278 A1    Oct. 1, 2009

(30) Foreign Application Priority Data

Mar. 26, 2008    (DE) .......................... 10 2008 000 840

(51) Int. Cl.
*E21B 10/46* (2006.01)
(52) U.S. Cl. ...................... 175/430; 175/434; 175/405.1
(58) Field of Classification Search .................. 175/403, 175/405.1, 430, 434
See application file for complete search history.

(56) References Cited

U.S. PATENT DOCUMENTS

| 4,911,254 | A | * | 3/1990 | Keith | 175/430 |
| 4,987,800 | A | * | 1/1991 | Gasan et al. | 76/108.2 |
| 5,597,272 | A | | 1/1997 | Moriguchi et al. | |
| 2004/0112650 | A1 | | 6/2004 | Masely | |
| 2005/0254908 | A1 | | 11/2005 | Norstrom et al. | |
| 2006/0032677 | A1 | | 2/2006 | Azar | |

FOREIGN PATENT DOCUMENTS

WO    WO-2007/038208    4/2007

* cited by examiner

*Primary Examiner* — David Andrews
(74) *Attorney, Agent, or Firm* — Abelman, Frayne & Schwab

(57) ABSTRACT

A segmental hard material insert for a working tool has a planar polycrystalline diamond layer (13) having, in its layer plane, a main cutting element (16, 36) and a contact edge (15) located opposite the main cutting element, with the main cutting element (16, 36) having two, facing outwardly, convex cutting sections (17, 27; 37, 47) and a smooth, facing outwardly, concave transitional region (19; 39, 49) connecting the two convex cutting sections (17, 27; 37, 47), and with the apex (20; 40) of the transitional region (19; 39, 47) being located on a central line of the main cutting element (16; 36).

5 Claims, 3 Drawing Sheets

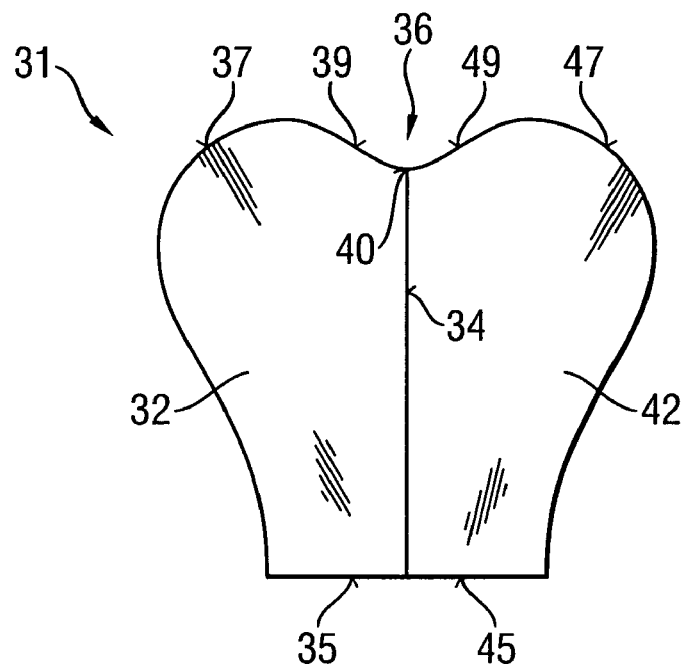
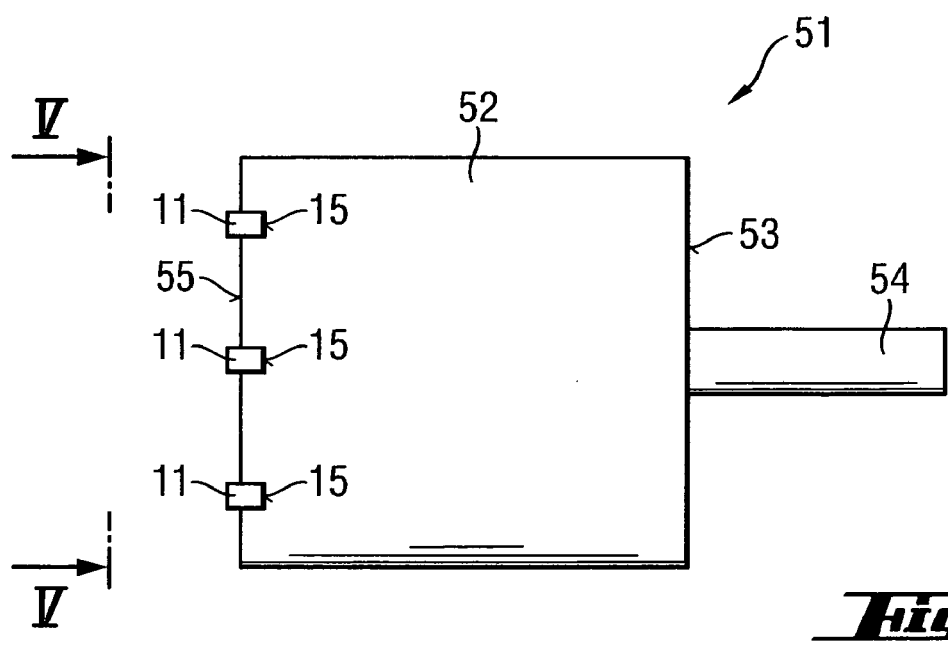

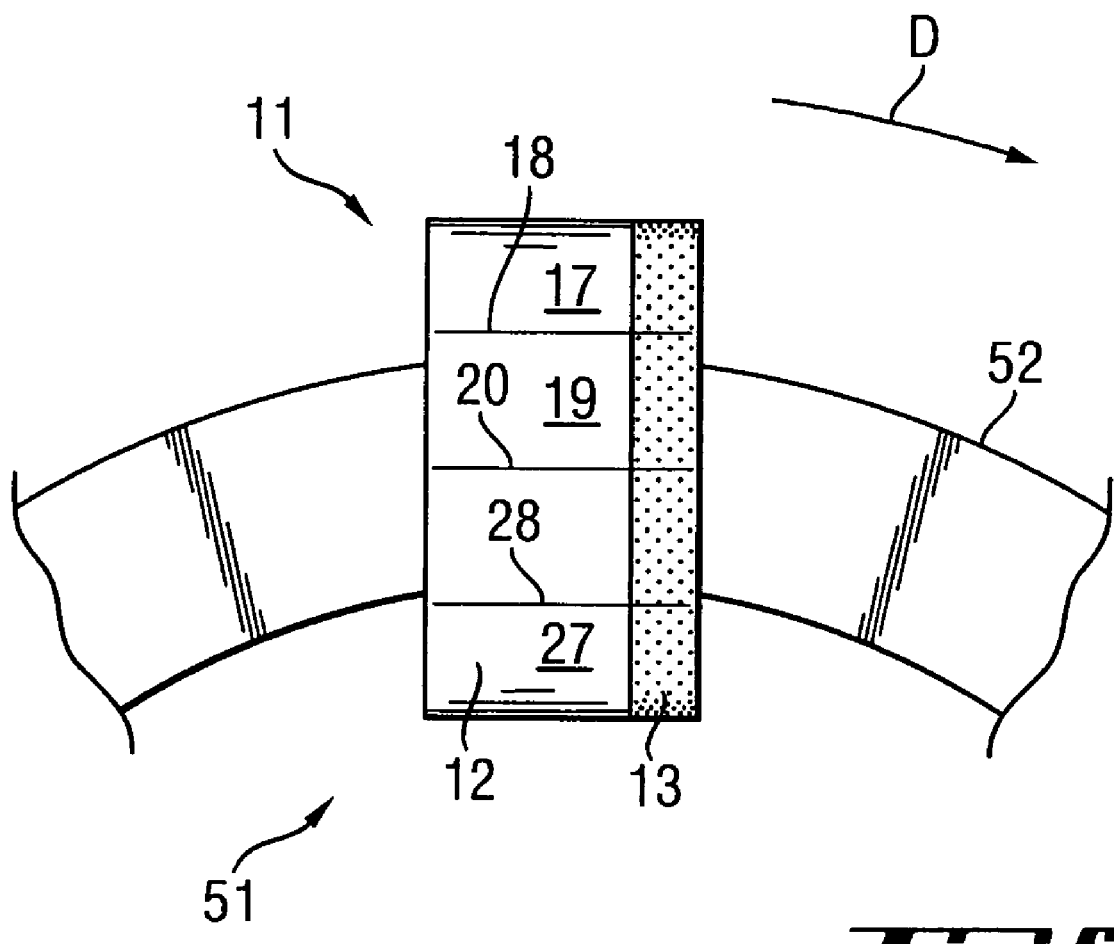

HARD MATERIAL INSERT AND CORE BIT

BACKGROUND OF THE INVENTION

1. Field of the Invention

The present invention relates to a segmental hard material insert for a working tool, comprising a planar polycrystalline diamond layer having, in its layer plane, a main cutting element and a contact edge located opposite the main cutting element. The present invention also relates to a core bit provided with a hard material insert described above.

2. Description of the Prior Art

Hard material inserts of the type described above are used in working tools such as, e.g., drills, core bits, or cutting discs, for working mineral constructional components formed of, e.g., concrete, stone, or masonry.

European Publication EP 1388641 A1 discloses a hard material insert for a working tool and formed as a segment and provided with a planar polycrystalline diamond layer having, in its layer plane, a main cutting element and a contact edge located opposite the main cutting element. As a result of the rounded transitional regions of the main cutting element, the stress superelevations, which are produced by point loads and likelihood of formation of fissures in the solder layer between the working tool and the contact edge of the hard material insert, are reduced. This increases the load capacity and the service life of the hard material insert. However, there is a need to improve such a hard material insert, e.g., with regard to its efficiency in removal of the material.

Accordingly, an object of the present invention is to provide a hard material insert for a working tool and having an improved material removal efficiency in addition to a high load capacity.

SUMMARY OF THE INVENTION

This and other objects of the present invention, which will become apparent hereinafter, are achieved by providing a hard material insert of the type described above in which the main cutting element has two, facing outwardly convex cutting sections and a smooth, facing outwardly concave transitional region connecting the two convex cutting sections, with the apex of the transitional region being located on a central line of the main cutting element.

Under "outwardly" in this case, is understood toward the environment. Under (mathematically) "smooth" is understood that the transitional region has radii without any jumps, notches, or steps along its extent. The main cutting element of the inventive hard material insert has, in its layer plane, a curved shape with two spherical cap-shaped cutting sections with a trough-shaped recess therebetween. As viewed from the opposite contact edge, the cutting sections of the main cutting element, which are spaced from each other in the layer plane, project outwardly and form two engagement points that simultaneously engage, penetrate, into a constructional component during operation with a working tool equipped with such hard material inserts. The apexes of both cutting sections advantageously lie essentially at the same height with respect to a line extending perpendicular to a center line of the main cutting element. During working of a constructional component, two breaking zones are produced simultaneously, with the cutting forces, which act in the constructional component, being superimposed over each other. This noticeably improves the cutting efficiency in comparison with known solutions, without increase of energy applied from a power tool to the working tool.

Advantageously, the cutting sections of the main cutting element are provided on a single element. This insures a simple manufacturing of the hard material insert and a simple mounting of the insert in a working tool.

Advantageously, the hard material insert is waist-shaped toward the contact edge in the layer plane. The hard material insert has, in the direction perpendicular to its center line, at the contact edge, a smaller extent than in the region of the cutting sections. Thereby, during working of a constructional component, a free space is provided toward the contact edge, next to the side edges of the hard material insert. The cut-off material of the constructional component can be received in this free space, which prevents jamming of the working tool in the constructional component to a most possible extent. The side edges of the hard material insert advantageously extend along a curved (mathematically) smooth line. Thereby, the stress peaks, which are caused by discontinuities, are prevented along their extent.

Advantageously, the hard material insert is formed mirror-symmetrically with respect to the central line of the main cutting element. Thereby, both cutting sections have the same shape. This insures advantageous cutting characteristics of the hard material insert during working of the constructional component and an easy mounting directly on or in a recess of a carrier body of a working tool. Under center line is understood an imaginary line located in the middle of main cutting element and extending toward the contact edge.

Advantageously, one cutting section has, at least in some regions, a first radius, and another cutting section has, at least in some regions, a second radius, with the first and second radii being oriented in the same direction with respect to the contact edge. The transitional region has, at least in some regions, a third radius extending in a direction opposite the first and second radii of the cutting sections. The radii of the cutting sections and of the transitional region can advantageously and favorably influence the cutting characteristics in a simple manner.

Advantageously, the first radius of one cutting section is equal to the second radius of the other cutting section. This insures advantageous cutting characteristics during working of the constructional component due to similar actions of both cutting sections.

Advantageously, a distance between apexes of the cutting sections corresponds to form 1 to 14 times preferably, from 1 to 5 times, of the radius of one of the cutting section. Unexpectedly, it has been found that with a so formed main cutting element, an advantageous superimposition of cutting forces applied by the two cutting sections to the constructional component takes place, which insures a high cutting output, without increase of the likelihood of formation of fissures in the hard material insert.

Advantageously, the radius of the cutting sections corresponds to from 0.8 to 10 times, preferably from 1 to 5 times of the radius of the transitional region. This prevents to a most possible extent the likelihood of formation of fissures in the hard material intent.

Advantageously, the radius of one of the cutting sections corresponds to 0.5 to 2.5 times of a distance between an apex of the transitional region and at least one of apexes of the cutting sections measured in a direction of the central line of the main cutting element. Such distance between the apex of the transitional region and the apexes of the cutting sections is advantageously selected in accordance with the penetration mass that corresponds to the penetration depth of the working tool for one revolution of the working tool.

A core bit advantageously has a plurality of hard material inserts, which increase the drilling efficiency. In addition to the increase of the service life of the core bit, a larger amount of the material is removed before the hard material insert is worn off.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a plan view of a second embodiment of a hard material insert according to the present invention;

FIG. 4 a side view of a core bit with hard material inserts according to the present invention; and FIG. 5 an end view of a hard material insert along line V-V in FIG. 4.

DETAILED DESCRIPTION OF THE PREFERRED EMBODIMENT

Figure 1:
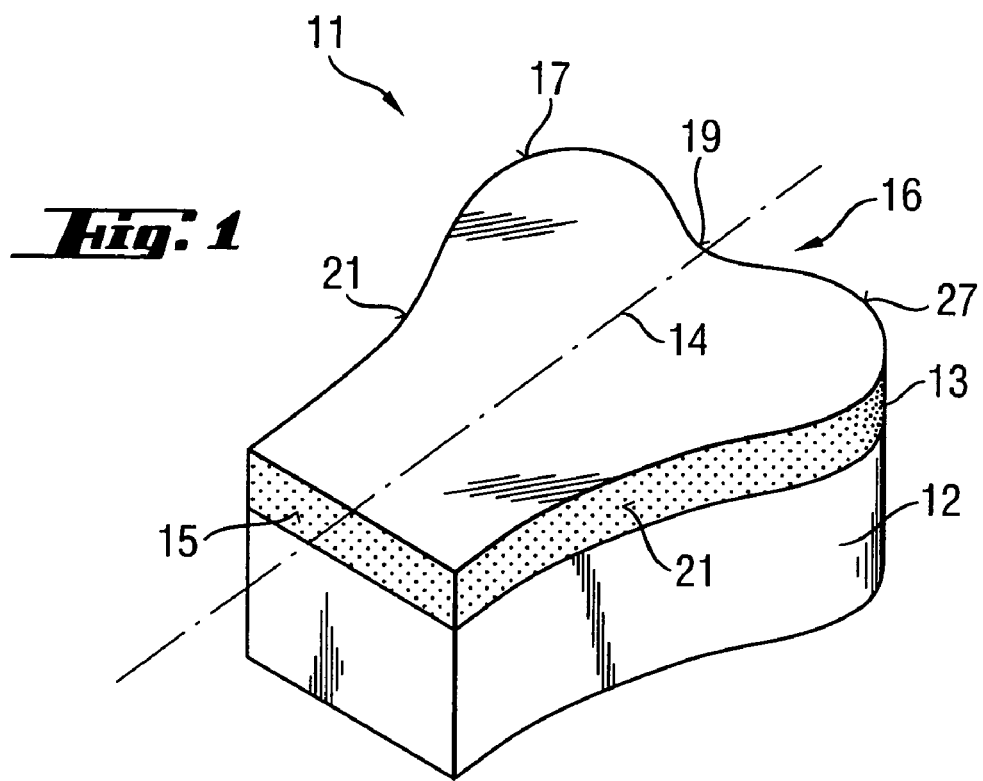
FIG. 1 a perspective view of a first embodiment of a hard material insert according to the present invention.
Figure 2:
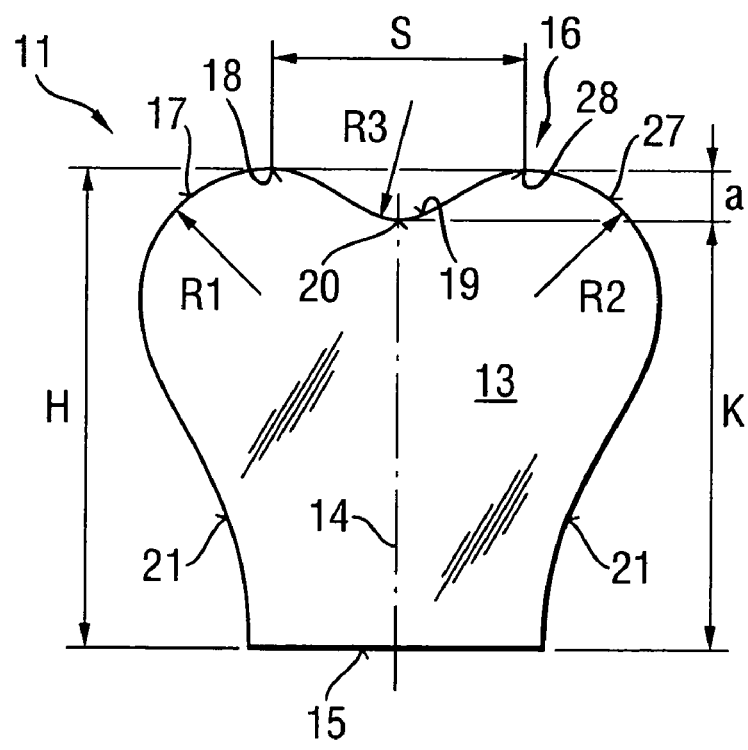
FIG. 2 a plan view of the hard material insert shown in FIG. 1.

A hard material insert 11 according to the present invention for a working tool, which is shown in FIGS. 1-2, is segmentally formed and has a carrier layer 12 formed, e.g., of a hard metal, and a planar polycrystalline diamond layer 13. The planar polycrystalline diamond layer 13 has, in the layer plane, a main cutting element 16 having different radii, a center line 14, and a contact edge 15 that is straight at least in some regions.

The main cutting element 16 has, in the layer plane, two convex cutting sections 17, 27 and a concave smooth transitional region 19 that connects the cutting sections 17 and 27. The apex 20 of the transitional region 19 lies on the center line 14. The cutting sections 17 and 27 of the cutting element 16 are provided on a single element. In the layer plane, the sides of the hard material insert 11 extending toward the contact edge 15 are waist-shaped, and the hard material insert 11 is formed mirror-symmetrically with respect to the center line 14. The transition regions 21, e.g., the side edges of the hard material insert 11, extend between the cutting sections 17, 27 and the contact edge 15 in form of an arc to thereby prevent stress peaks and resulting punctual overloads from acting on the hard material insert 11.

The cutting section 17 of the main cutting element 16 has, at least in some regions, a radius R1, and the other cutting section 27 of the main cutting element 16 has, at least in some regions, a radius R2, with both radii R1 and R2 being oriented in the same direction relative to the opposite contact edge 15. The radius R1 of the cutting section 17 is equal to the radius R2 of the other cutting section 27. The apexes 18, 28 of the cutting sections 17, 27 are located at the same height with respect to a line extending perpendicular to the center line 14 of the main cutting element 16. In the embodiment of the inventive hard material insert 11 shown in FIGS. 1-2, the contact edge 15 extends parallel to the apex line. Thus, the apexes 18, 28 of the cutting sections 17, 27 not only are spaced from each other by a distance S but also are spaced by the same distance H from the contact edge 15.

The transitional region 19 has a radius R3 extending in a direction opposite the radii R1, R2 of the cutting sections 17, 27. The apex 20 of the transitional region 19 lies on the center line 14 of the main cutting element 16 and is spaced by a distance K from the contact edge 15. The distance K is smaller than the distance 14 by which the apexes 18, 28 of the cutting sections 17, 27 are spaced from the contact edge 15.

The distance S of the apexes 18, 28 of the cutting sections 17, 27 from each other corresponds to from 1 to 14 times, preferably, from 1 to 5 times of the radii R1, R2 of the cutting sections 17, 27. The radii R1, R2 of the cutting sections 17, 27 correspond to from 0.8 to 10 times, preferably, from 1 to 5 times of the radius R3 of the transitional region 19. The radii R1, R2 of the cutting sections correspond to from 0.5 to 2.5 times of the distance a between the apex 20 of the transitional region 19 and at least one of the apexes 18, 28 of the cutting sections 17, 27 measured in the direction toward the center line 14 of the main cutting element 16.

According to an advantageous embodiment of the present invention, the radii R1, R2 of the cutting sections 17, 18 amount to 1-5 mm, preferably, 1.1-3 mm. The distance S of the apexes 18, 28 of the cutting sections 17, 27 amount to from 1 to 14 mm, preferably, from 1.1 mm to 5 mm. The radius R3 of the transitional region 19 amounts to from 0.1 mm to 4 mm, preferably, from 0.2 mm to 1.5 mm. The distance a between the apex 20 of the transition al region 19 and the apex 18, 28 of the cutting section 17, 27 amounts to 0.01 to 2 mm, preferably, 0.1 mm to 1 mm.

FIG. 3 shows a hard material insert 31 that, in distinction from the hard material insert 11 is formed of two members 32, 42. The first element 32 has a cutting section 37 and a straight contact edge 35. The second element 42 has a cutting section 47 and a straight contact edge 45. The element 42 is formed rotationally symmetrically with respect to element 32. The two elements 32, 42 form, upon assembly, a common line that forms the center line 34 of the main cutting element 36 of the hard material insert 31. A point at which the transitional region 39 of the element 32 and the transitional region 49 of the element 42 meet, in the assembled condition of the hard material insert 31, forms an apex 40 of the transitional region of the hard material insert 31 that is formed by the transitional regions 39 and 49.

The core bit 51, which is shown in FIGS. 4-5, has a tubular carrier body 52, at one end 53 of which, there is provided a shank 54 for mounting the core bit in a power tool, not shown, and at another, opposite, free end 55 of which, there are provided several hard material inserts 11 shown in FIGS. 1-2. The contact edges 15 of the hard material inserts 11 are arranged, in the mounted condition, at the free end 55 or in recesses of the carrier body 52 formed in the free end 55. Instead of the hard material inserts 11 or in combination therewith, a plurality of hard material inserts 31, shown in FIG. 3 can be provided on the free end 55 of the core bit 51.

The polycrystalline diamond layer 13 of the hard material insert 11 is arranged in the rotational direction D of the carrier body 52 of the core bit 51, so that this layer contacts a constructional component first upon application of the core bit 51.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A segmental hard material insert for a working tool, comprising a planar polycrystalline diamond layer (13) having, in a layer plane thereof, a single main cutting element (16, 36) and a contact edge (15) which is straight at least in some regions and is located opposite the main cutting element, the main cutting element (16, 36) having two, facing outwardly, convex cutting sections (17, 27; 37, 47) and a smooth, facing outwardly, concave transitional region (19; 39, 49) connecting the two convex cutting sections (17, 27; 37, 47) and providing a smooth transition between the convex cutting sections and the transition region, with the apex (20; 40) of the transitional region (19; 39, 47) being located on a central line of the main cutting element (16; 36).

2. The hard material insert according to claim 1, wherein the hard material insert (11; 31) is waist-shaped toward the contact edge (15, 35, 45) in the layer plane.

3. The A hard material insert according to claim 1, wherein the hard material insert (11; 31) is formed mirror-symmetrically with respect to the central line (14; 34) of the main cutting element (16; 36).

4. The hard material insert according to claim 1, wherein the main cutting element (16, 36) has two side, smooth, facing outwardly, concave transition regions (21) connecting the two convex cutting sections (17, 27; 37, 47) with the contact edge (15), respectively.

5. A segmental hard material insert for a working tool, comprising a planar polycrystalline diamond layer (13) having, in a layer plane thereof, a main cutting element (16, 36) and a contact edge (15) located opposite the main cutting element, the main cutting element (16, 36) having two, facing outwardly, convex cutting sections (17, 27; 37, 47) and a smooth, facing outwardly, concave transitional region (19; 39, 49) connecting the two convex cutting sections (17, 27; 37, 47), with the apex (20; 40) of the transitional region (19; 39, 47) being located on a central line of the main cutting element (16; 36), wherein one cutting section (17) has, at least in some regions, a first radius (R1), and another cutting section (27) has, at least in some regions, a second radius (R2), the first and second radii (R1, R2) being oriented in the same direction with respect to the contact edge (15), and wherein the transitional region (19) has, at least in some regions, a third radius (R3) extending opposite the first and second radii (R1, R2) of the cutting sections (17, 27), wherein the main cutting element (16, 36) has two side, smooth, facing outwardly, concave transition regions (21) connecting the two convex cutting sections (17, 27; 37, 47) with the contact edge (15), respectively.

* * * * *